Patented July 11, 1933

1,917,475

UNITED STATES PATENT OFFICE

OTTMAR WAHL, OF LEVERKUSEN-ON-THE-RHINE, GERMANY, ASSIGNOR TO GENERAL ANILINE WORKS, INC., OF NEW YORK, N. Y., A CORPORATION OF DELAWARE

PROCESS OF PREPARING BASIC DYESTUFFS DERIVED FROM INDOLINE BASES

No Drawing. Application filed October 18, 1930, Serial No. 489,705, and in Germany November 16, 1929.

The present invention relates to a process of preparing basic dyestuffs derived from indoline bases and to the new product obtainable thereby.

In U. S. Letters Patent 1,755,678 I have described new dyestuffs derived from indoline bases of the general formula:

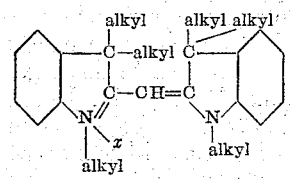

$x$ meaning an organic or inorganic acid radicle and wherein the benzene nuclei may be further substituted.

According to said Letters Patent these dyestuffs are prepared by treating a 1.3.3-trialkyl-2-methylene indoline (such as 1.3.3-trimethyl-2-methylene-indoline) of the formula:

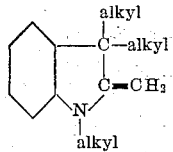

wherein the benzene nucleus may be substituted or not or a salt thereof of the formula:

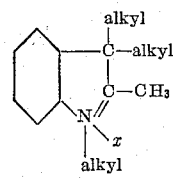

wherein the benzene nucleus may be substituted or not and $x$ stands for an organic or inorganic acid radicle with an ester or a salt of nitrous acid in the presence of an organic acid anhydride, as for example acetic anhydride which serves as a condensing agent.

According to the present invention, these dyestuffs are prepared by using in said process a halogenide of nitrous acid, such as nitrosylchloride or bromide instead of an ester or a salt of nitrous acid. The process is carried out by causing one molecule of the halogenide of nitrous acid and one molecule of a 1.3.3-trialkyl-2-methylene-indoline to react upon each other in an inert organic solvent, such as benzene or carbontetrachloride, whereby are formed nitroso compounds according to the following equation:

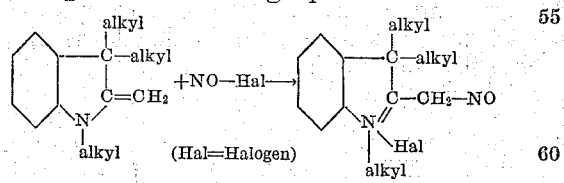

(Hal=Halogen)

These nitroso compounds which are well crystallizing, stable substances then are allowed to react with a further molecule of the same or a different 1.3.3-trialkyl-2-methylene-indoline in the presence of an organic acid anhydride, as for example, acetic anhydride which serves as condensing agent, thus, when using different 1.3.3-trialkyl-2-methylene-indole compounds asymmetrical dyestuffs being obtained. When preparing the symmetrical dyestuffs it is of advantage to perform the whole process in one step, that means to dissolve the 1.3.3-trialkyl-2-methylene indoline compound in the condensing agent, especially acetic acid anhydride, and introducing the requisite quantity of halogenide of nitrous acid; in this manner the formation of the nitroso compound is immediately followed by the condensation to the dyestuff.

The whole process probably proceeds according to the following scheme:

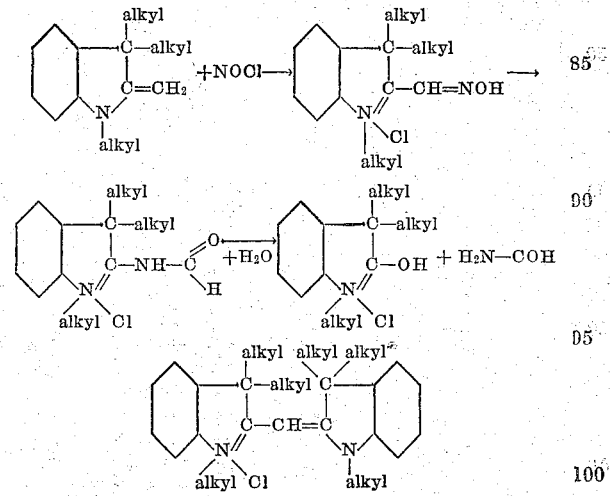

The invention is illustrated by the following examples:

*Example 1.*—In a solution of 1 molecule of 1.3.3-trimethyl-2-methylene-indoline in carbon tetrachloride 1 molecule of nitrosylchloride is introduced. The hydrochloric acid salt of the 1.3.3-trimethyl-2-nitrosomethylene indoline precipitates and is either isolated by filtering with suction or agitated with water. It can be obtained by salting out of the aqueous solution in weakly yellowish colored crystals of a melting point of 195° C.

One part by weight of the product thus obtained is mixed with one part by weight of 1.3.3-trimethyl-2-methylene indoline in about 5 parts by weight of acetic acid anhydride until the amount of the separating yellow dyestuff formed does no more increase. In order to decompose the acetic acid anhydride water is added and the dyestuff is precipitated by common salt and zinc chloride as zinc chloride double salt.

The dyestuff of the formula

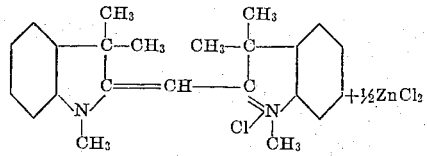

is identical to the one described in Example 1 of U. S. Patent No. 1,755,678.

*Example 2.*—5 parts by weight of 1.3.3-trimethyl-2-methylene indoline are dissolved in about 20 parts by weight of acetic acid anhydride and, advantageously while cooling, 1 part by weight of nitrosylchloride is introduced.

The working up follows as in Example 1 and the same yellow dyestuff is obtained.

*Example 3.*—1 part by weight of hydrochloric acid salt of the 1,3,3-trimethyl-2-nitrosomethylene indoline is introduced with 1 part by weight of 1.3.3-trimethyl-2-methylene-5-amido indoline into 5 parts by weight of acetic acid anhydride, advantageously at a temperature of about 40° C. slowly for about 3-4 hours, and stirred until the formation of the dyestuff is finished. In order to obtain decomposition of the anhydride, water is added and the dyestuff is precipitated with zinc chloride and common salt.

By recrystallizing from water the dyestuff is obtained pure and gives, dyed according to the usual methods for basic dyestuffs, on tanned cotton an orange-yellowish color with a more reddish tint than the dyestuff described in Example 1. Obviously the zinc chloride double salt of the unsymmetrical dyestuff is present of the formula:

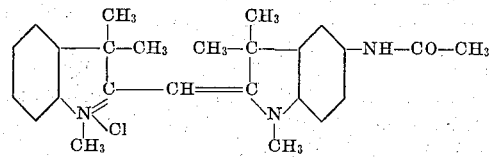

I claim:
1. The process which comprises causing a 1.3.3-trimethyl-2-methylene indoline and an about equimolecular portion of a halogenide of nitrous acid to react upon each other and reacting upon the intermediate product formed with an about equimolecular portion of a 1.3.3-trimethyl-2-methylene indoline in the presence of acetic acid anhydride.

2. The process which comprises dissolving 5 parts by weight of 1.3.3-trimethyl-2-methylene indoline in about 20 parts by weight of acetic acid anhydride and introducing into the solution 1 part by weight of nitrosylchloride.

3. The dyestuff corresponding probably to the formula:

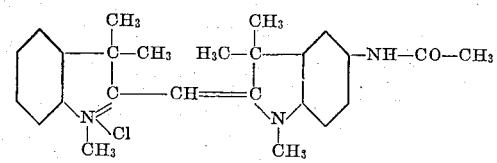

dyeing tanned cotton in orange-yellowish color of good fastness to light.

In testimony whereof, I affix my signature.
OTTMAR WAHL.